US012729834B2

(12) United States Patent
Micunek et al.

(10) Patent No.: US 12,729,834 B2
(45) Date of Patent: Sep. 8, 2026

(54) MANUAL FROST MECHANISM

(71) Applicant: ROBE lighting s.r.o., Roznov pod Radhostem (CZ)

(72) Inventors: Tomas Micunek, Roznov pod Radhostem (CZ); Jan Vilem, Valasske Mezirici (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 19/394,663

(22) Filed: Nov. 19, 2025

(65) Prior Publication Data

US 2026/0078891 A1 Mar. 19, 2026

(51) Int. Cl.

*F21V 14/08* (2006.01)
*F21V 9/40* (2018.01)
*F21V 14/06* (2006.01)

(52) U.S. Cl.

CPC ................ *F21V 14/08* (2013.01); *F21V 9/40* (2018.02); *F21V 14/06* (2013.01)

(58) Field of Classification Search

CPC ............. F21V 14/08; F21V 9/40; F21V 14/06
See application file for complete search history.

(56) References Cited

U.S. PATENT DOCUMENTS 5,980,066 A * 11/1999 Belliveau ................ F21V 14/06 362/323
11,149,922 B1 * 10/2021 Reyes ..................... F21V 14/08
2002/0075685 A1 * 6/2002 Rasmussen ............. F21V 29/67 362/373
2011/0085323 A1 * 4/2011 Chien ..................... F21V 21/08 362/183
2015/0300604 A1 * 10/2015 Jurik ..................... F21V 11/186 362/281
2018/0283632 A1 * 10/2018 Rasmussen .......... G03B 21/001
2020/0224854 A1 * 7/2020 Jurik ..................... F21S 10/023
2021/0095834 A1 * 4/2021 Jiang ....................... F21V 21/15

* cited by examiner

*Primary Examiner* — Bryon T Gyllstrom
(74) *Attorney, Agent, or Firm* — Conley Rose, P.C.; Brooks W Taylor

(57) ABSTRACT

A luminaire includes a light source that emits a light beam and a frost filter mechanism that is mechanically coupled to a lens group of the luminaire and configured to move with the lens group along an optical axis of the light beam. The frost filter mechanism includes a frost filter configured to be moved from a first position outside of the light beam to a second position in the light beam. The frost filter mechanism also includes a toggle control coupled to the frost filter, where the toggle control is configured to rotate the frost filter from the first position to the second position when the toggle control is rotated in a first direction and to rotate the frost filter from the second position to the first position when the toggle control is rotated in a second direction.

15 Claims, 3 Drawing Sheets

MANUAL FROST MECHANISM

TECHNICAL FIELD OF THE DISCLOSURE

The disclosure generally relates to lighting fixtures, and more specifically to a manual frost mechanism for use in such a lighting fixture.

BACKGROUND

Some luminaires in the entertainment and architectural lighting markets may be used in theatres, television studios, concerts, theme parks, night clubs, and other venues. Some luminaires provide manual control over parameters such as color, focus, beam size, beam shape, and/or beam pattern. The optical systems of such luminaires may be designed to enable a user to control the beam size (or 'zoom'), from a very narrow output beam to a wider, wash beam. Such control may allow such luminaires to be used with long throws to a target or for wider, more traditional wash effects. Optical systems with the ability to produce narrow beams may be referred to as 'Beam' optics, while optical systems with the ability to produce wide beams may be referred to as 'Wash' optics.

Regardless of beam size, the optical systems of such luminaires may also be designed to enable a user to add a frosted effect to the beam. For example, a diffuser or frosted material (e.g., frosted glass or acrylic) is placed in the beam to produce a more diffused beam effect having visually softer beam edges.

SUMMARY

In a first embodiment, a frost filter mechanism is mechanically coupled to a lens group and configured to move with the lens group along an optical axis of a light beam. The frost filter mechanism includes a frost filter configured to be moved from a first position outside of the light beam to a second position in the light beam. The frost filter mechanism also includes a toggle control coupled to the frost filter, where the toggle control is configured to rotate the frost filter from the first position to the second position when the toggle control is rotated in a first direction and to rotate the frost filter from the second position to the first position when the toggle control is rotated in a second direction.

In a second embodiment, a luminaire includes a light source that emits a light beam and a frost filter mechanism that is mechanically coupled to a lens group of the luminaire and configured to move with the lens group along an optical axis of the light beam. The frost filter mechanism includes a frost filter configured to be moved from a first position outside of the light beam to a second position in the light beam. The frost filter mechanism also includes a toggle control coupled to the frost filter, where the toggle control is configured to rotate the frost filter from the first position to the second position when the toggle control is rotated in a first direction and to rotate the frost filter from the second position to the first position when the toggle control is rotated in a second direction.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments are illustrated in the figures, like numerals being used to refer to like and corresponding parts of the various drawings.

Figure 1:
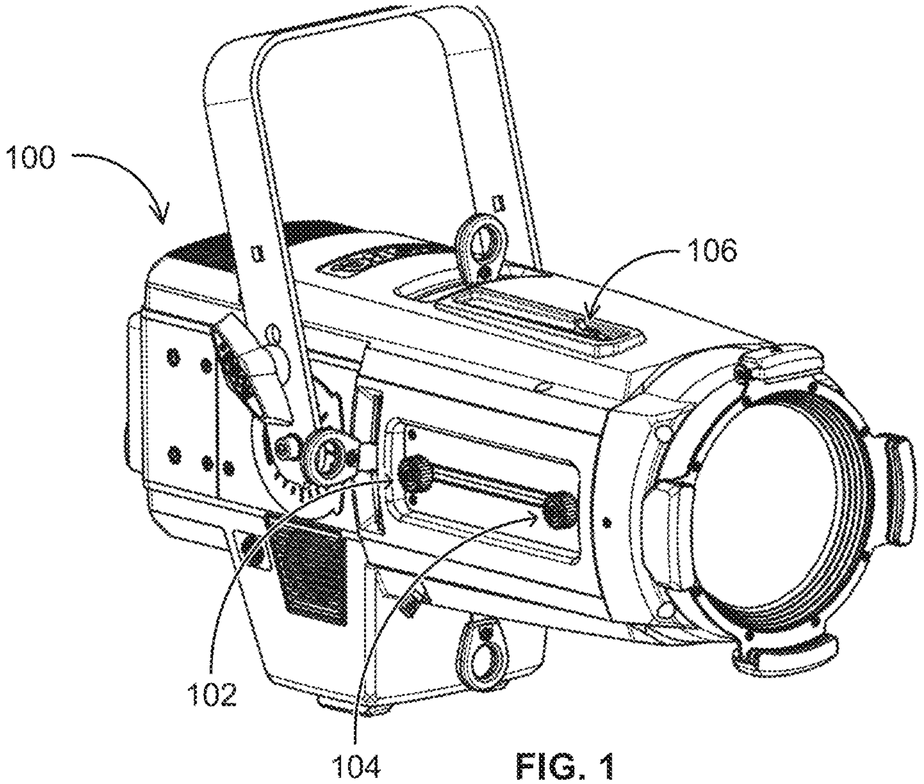
FIG. 1 presents an isometric view of a luminaire according to the disclosure.

FIG. 1 presents an isometric view of a luminaire 100 according to the disclosure. As will be shown in more detail in later figures, the luminaire 100 includes a zoom optical system comprising a focus lens group that is configured for motion along an optical axis of the luminaire 100. A knob 102 is configured to clamp the focus lens group in its current position on the optical axis when the knob 102 is rotated by an operator of the luminaire 100 in a first direction and to unclamp and allow movement of the focus lens group along the optical axis when the knob 102 is rotated in a second direction. The knob 102 is also configured to operate as a handle to enable the operator to move the focus lens group along the optical axis of the luminaire 100 to a desired position.

The zoom optical system of the luminaire 100 further includes a zoom lens group that is configured for motion along the optical axis of the luminaire 100. A knob 104 is configured to clamp the zoom lens group in its current position on the optical axis when the knob 104 is rotated by the operator in a first direction and to unclamp and allow movement of the zoom lens group along the optical axis when the knob 104 is rotated in a second direction. The knob 104 is also configured to operate as a handle to enable the operator to move the zoom lens group along the optical axis of the luminaire 100 to a desired position.

The zoom optical system of the luminaire 100 further includes a frost filter mechanism 106 that is mechanically coupled to the zoom lens group and configured to move along the optical axis of the luminaire 100 with the zoom lens group. The manual frost filter mechanism 106 is configured to insert and remove a frost filter into a light beam passing through the zoom lens group. A toggle control protrudes through an aperture in a cover of the luminaire 100 and is configured to insert the frost filter into the light beam in response to the toggle control being moved manually by the operator in a first direction and to remove the frost filter from the light beam in response to the toggle control being moved manually in a second direction. The frost filter mechanism 106 is shown and discussed in more detail with reference to FIGS. 3 and 4.

Figure 2:
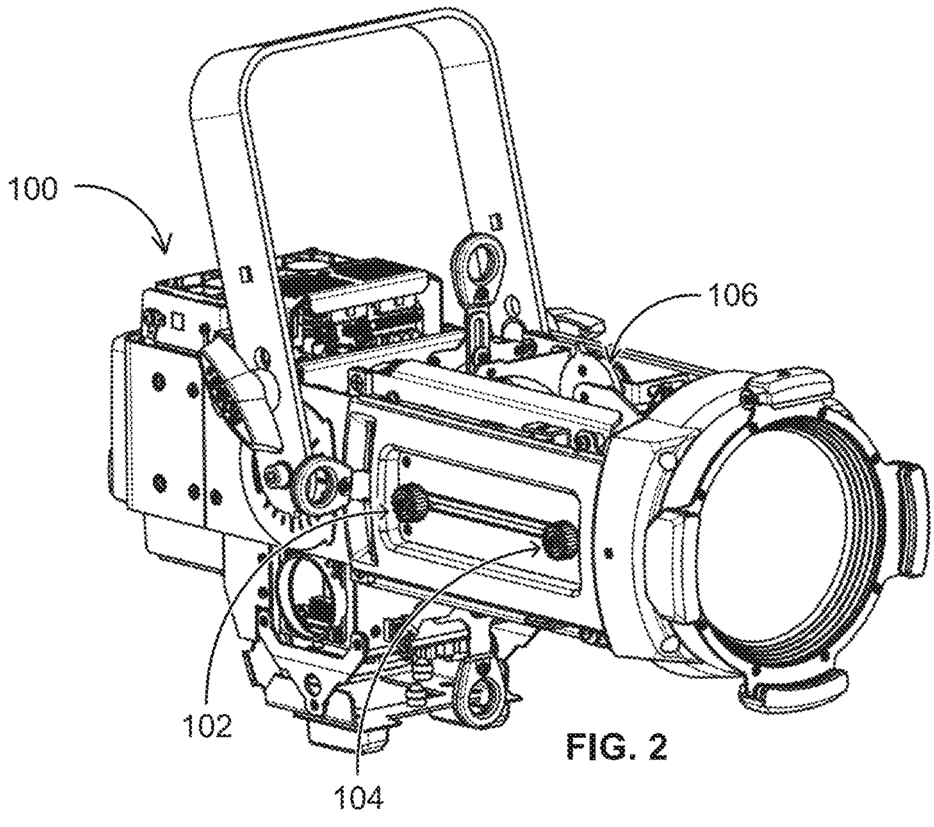
FIG. 2 presents an isometric view of the luminaire of FIG. 1 with covers removed.

FIG. 2 presents an isometric view of the luminaire 100 of FIG. 1 with covers removed. A greater portion of the manual frost filter mechanism 106 may be seen in FIG. 2 than in FIG. 1. The manual frost filter mechanism 106 is viewed from a first side in FIG. 2 and from the opposite side in FIGS. 3 and 4.

Figure 3:
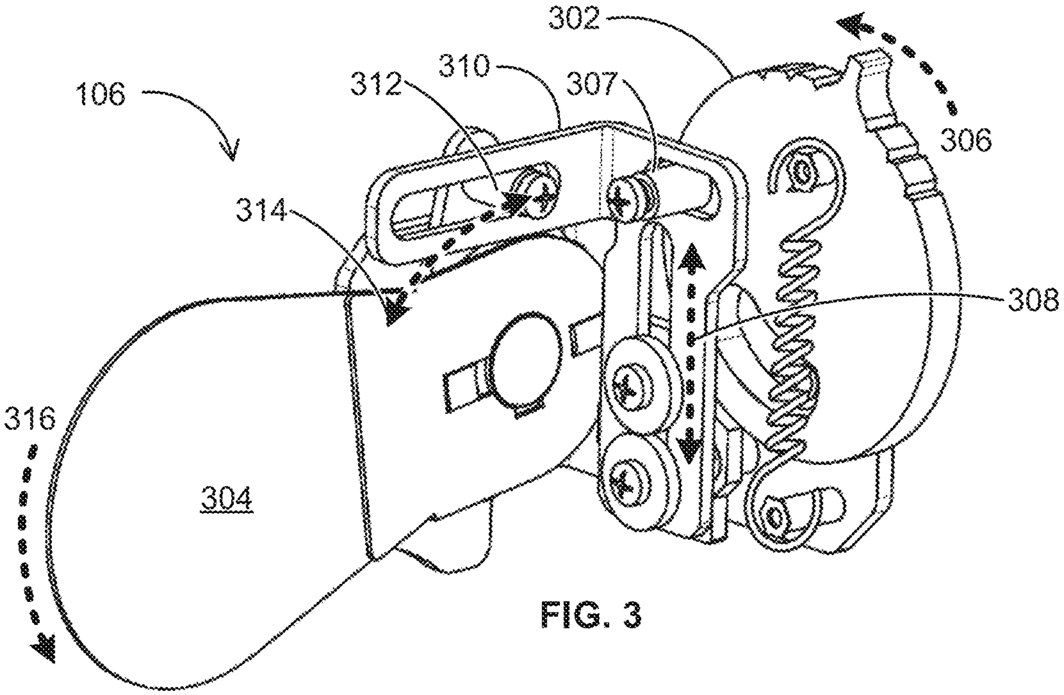
FIG. 3 presents an isometric view of a manual frost filter mechanism of the luminaire of FIG. 1, in a first configuration.

FIG. 3 presents an isometric view of a manual frost filter mechanism 106 of the luminaire of FIG. 1 in a first configuration. In the first configuration, a frost filter 304 is positioned outside of (or removed from) a light beam 318 (shown in FIG. 4) that passes through the zoom lens group. The frost filter 304 is rotatably coupled to the manual frost filter mechanism 106 and configured to rotate in a plane orthogonal to the light beam 318. By manual rotation of a toggle control 302 by the operator, the manual frost filter mechanism 106 is moved from the first configuration, shown in FIG. 3, to a second configuration, shown in FIG. 4. The zoom lens group and the first and second configurations of the frost filter 304 are also discussed with reference to FIGS. 5-7.

When the toggle control 302 is rotated in the direction indicated by arrow 306, a pin 307 extending from the toggle control 302 through an aperture in a linkage 310 converts the rotary motion of the toggle control 302 into linear motion of the linkage 310 in the linear direction indicated by arrow 308. A second pin 312 is coupled to the rotatable frost filter 304 and extends through a second aperture in the linkage 310. Downward motion of the linkage 310 converts the linear motion of the linkage 310 into rotary motion by pushing the second pin 312 from a first end of the second aperture to a second end in the direction indicated by arrow 314, thereby rotating the frost filter 304 in the direction indicated by arrow 316. Fully rotating the toggle control 302 causes the manual frost filter mechanism 106 to transition from the first configuration of FIG. 3 to the second configuration of FIG. 4. When the toggle control 302 is rotated in the opposite direction, the linkage 310, the second pin 312, and the frost filter 304 move in the opposite directions to return the manual frost filter mechanism 106 to transition from the second configuration of FIG. 4 to the first configuration of FIG. 3.

Figure 4:
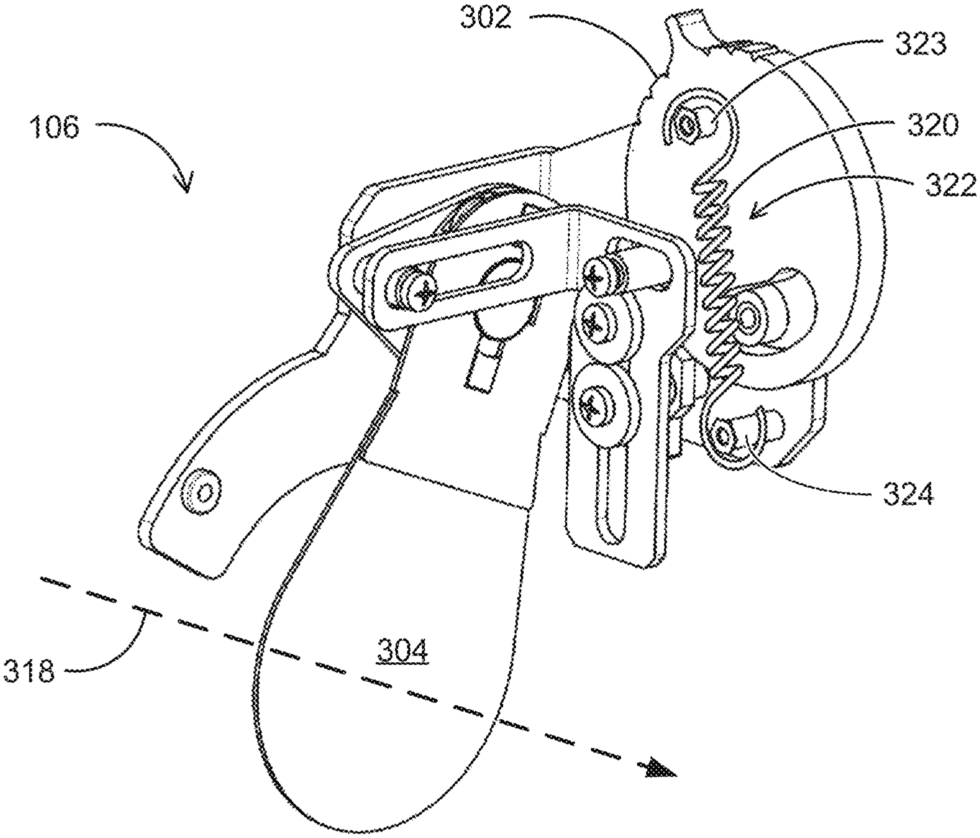
FIG. 4 presents an isometric view of the manual frost filter mechanism of FIG. 3, in a second configuration.

FIG. 4 presents an isometric view of the manual frost filter mechanism 106 of FIG. 3, in the second configuration. As described with reference to FIG. 3, rotation of the toggle control 302 has rotated the frost filter 304 into the light beam (indicated by arrow 318) passing through the zoom lens group. One or more features of the toggle control 302 (such as the tab 326 and adjacent knurls) are configured to facilitate the operator manually rotating the toggle control 302, for example with a fingertip. The tab 326, which protrudes through a cover of the luminaire 100, is also configured to indicate visually, by its position, whether the frost filter 304 has been removed from the light beam 318 (first position) or rotated into the light beam 318 (second position).

A spring 320 is coupled between a third pin 323, extending from the toggle control 302, and a fourth pin 324, extending from the manual frost filter mechanism 106. The fourth pin 324 (or other feature) is mounted in a fixed position relative to an axis of rotation 322 of the toggle control 302. The spring 320 configures the toggle control 302 to operate as an over-center mechanism. In the first configuration, the spring 320 passes on a first side of the axis of rotation 322, and resists rotation of the toggle control 302 and movement of the manual frost filter mechanism 106 from the first configuration. In the second configuration, the spring 320 passes on a second side of the axis of rotation 322, resisting rotation of the toggle control 302 and movement of the manual frost filter mechanism 106 from the second configuration. Configuration of the toggle control 302 to operate as an over-center mechanism causes the toggle control 302 to resist stopping in an intermediate configuration between the first configuration and the second configuration.

Figure 5:
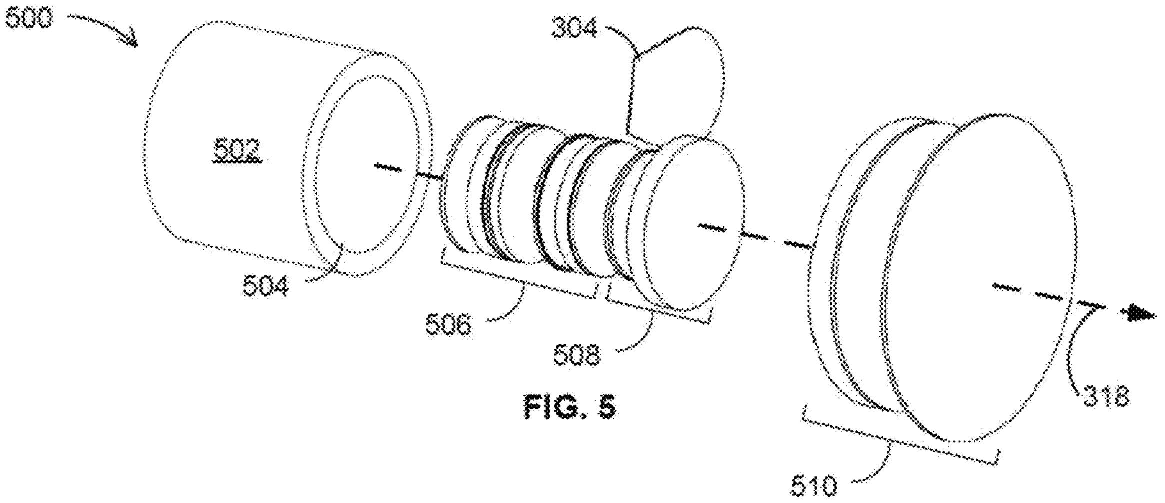
FIG. 5 presents an isometric view of a zoom optical system of the luminaire of FIG. 1, in a first configuration.

FIG. 5 presents an isometric view of a zoom optical system 500 of the luminaire 100 of FIG. 1, in a first configuration. A light source 502 emits the light beam 318 from an aperture 504. The light beam 318 passes first through a focus lens group 506. The light beam 318 then passes through a zoom lens group 508 and into a projection lens group 510, before being emitted from the luminaire 100. The projection lens group 510 is in a fixed position in the luminaire 100, and the focus lens group 506 and the zoom lens group 508 are configured to move along the optical axis of the light beam 318. In other embodiments, the focus lens group 506, the zoom lens group 508, and the projection lens group 510 may have more or fewer lenses than shown in FIGS. 5-7, including a lens group comprising a single lens.

As discussed with reference to FIG. 1, the frost filter mechanism 106 (comprising the frost filter 304) is mechanically coupled to the zoom lens group 508 and configured to move along the optical axis of the luminaire 100 with the zoom lens group 508. In other embodiments, the frost filter mechanism 106 is mechanically coupled to the focus lens group 506 and configured to move along the optical axis of the luminaire 100 with the focus lens group 506. Thus, frost filter mechanism 106 is mechanically coupled to a lens group and configured to move with the lens group along an optical axis of a light beam of the luminaire 100. The frost filter 304 is shown in FIGS. 5-7 without the frost filter mechanism 106 for simplicity and clarity.

In the first configuration of the zoom optical system 500, shown in FIG. 5, the focus lens group 506 and the zoom lens group 508 are moved to their closest respective positions relative to the light source 502. In the first configuration, the zoom optical system 500 emits a light beam 318 having a minimum (or narrow) beam angle.

Figure 6:
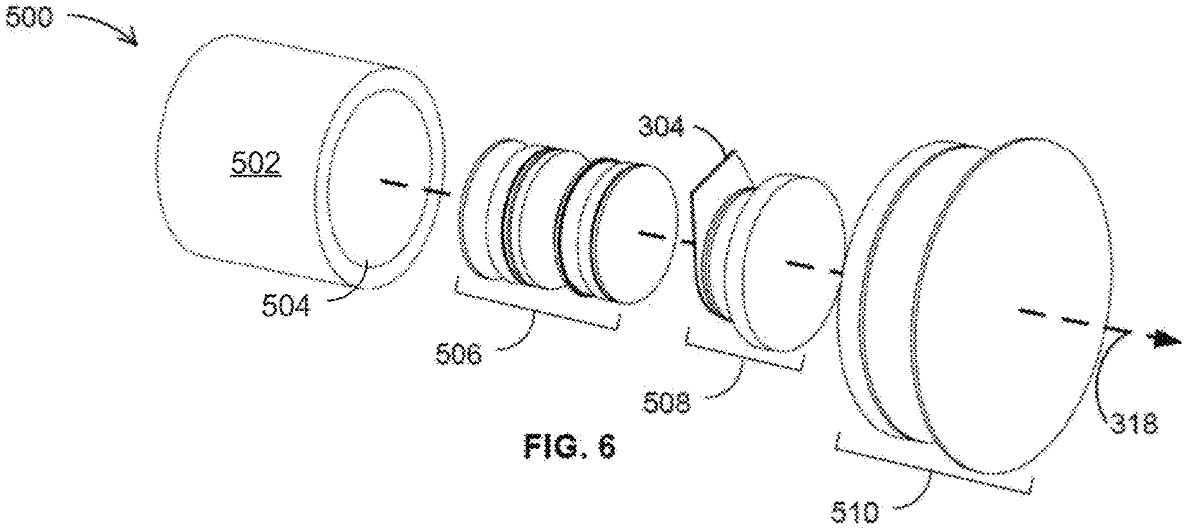
FIG. 6 presents an isometric view of the zoom optical system of FIG. 5, in a second configuration.

FIG. 6 presents an isometric view of the zoom optical system 500 of FIG. 5, in a second configuration. In the second configuration, the focus lens group 506 and the zoom lens group 508 are moved into intermediate positions away from the light source 502 and separated from each other. In the second configuration, the zoom optical system 500 emits a light beam 318 having an intermediate beam angle between the narrow beam of the first configuration and a maximum beam angle of a third configuration, shown in FIG. 7.

Figure 7:
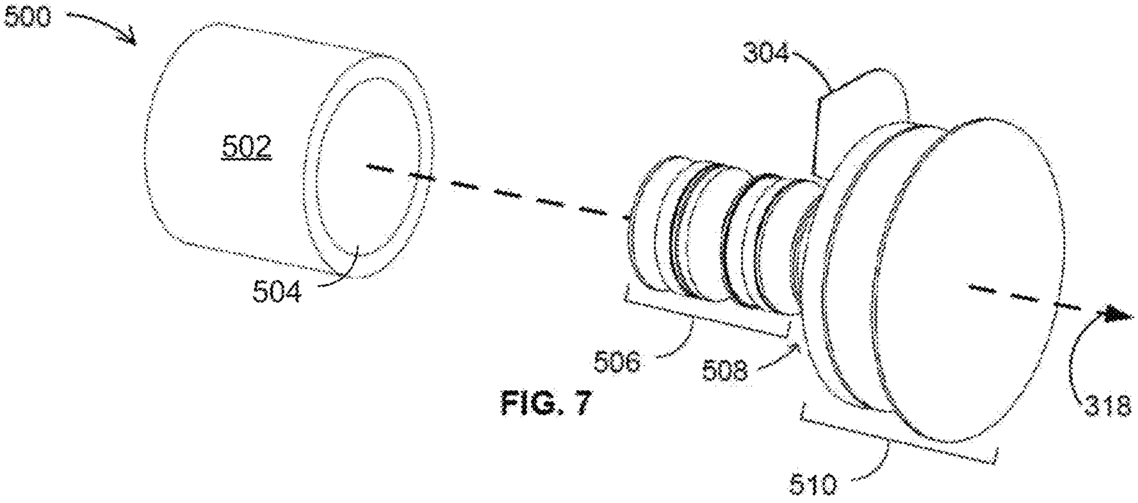
FIG. 7 presents an isometric view of the zoom optical system of FIG. 5, in a third configuration.

FIG. 7 presents an isometric view of the zoom optical system of FIG. 5, in a third configuration. In the third configuration, the focus lens group 506 and the zoom lens group 508 are moved into their closest positions relative to the projection lens group 510. In the third configuration, the zoom optical system 500 emits a light beam 318 having a maximum (wide) beam angle.

As discussed above, the frost filter mechanism 106 moves along the optical axis of the luminaire 100 with the zoom lens group 508. The frost filter mechanism 106 may be operated in any configuration of the focus lens group 506, the zoom lens group 508, and the projection lens group 510. FIGS. 5 and 7 show the frost filter 304 rotated to a position outside of the light beam 318. FIG. 6 shows the frost filter 304 rotated to a position in the light beam 318.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A frost filter mechanism mechanically coupled to a lens group and configured to move with the lens group along an optical axis of a light beam, wherein:
   - the frost filter mechanism comprises:
     - a frost filter configured to be moved from a first position outside of the light beam to a second position in the light beam; and
     - a toggle control coupled to the frost filter and configured to:
       - rotate the frost filter from the first position to the second position when the toggle control is rotated in a first direction; and
       - rotate the frost filter from the second position to the first position when the toggle control is rotated in a second direction;
     - wherein the toggle control is configured to operate as an over-center mechanism configured to:
       - resist rotation of the toggle control in the first direction when the frost filter is in the first position; and
       - resist rotation of the toggle control in the second direction when the frost filter is in the second position; and
     - wherein the toggle control comprises a spring mechanically coupled at a first end to the toggle control and at a second end to a feature mounted in a fixed position relative to an axis of rotation of the toggle control.

2. The frost filter mechanism of claim 1, wherein the toggle control is mechanically coupled to the frost filter by a linkage configured to be moved by the toggle control in a first linear direction to rotate the frost filter from the first position to the second position and in a second linear direction to rotate the frost filter from the second position to the first position.

3. The frost filter mechanism of claim 1, wherein the lens group is a zoom lens group of a zoom optical system.

4. The frost filter mechanism of claim 1, wherein the lens group is a focus lens group of a zoom optical system.

5. The frost filter mechanism of claim 1, wherein the toggle control is configured to be manually rotated by an operator of the frost filter mechanism.

6. The frost filter mechanism of claim 5, wherein the toggle control comprises one or more features configured to facilitate manual rotation of the toggle control.

7. The frost filter mechanism of claim 1, wherein the toggle control comprises a feature configured to indicate visually whether the frost filter is in the first position or the second position.

8. A luminaire comprising:
   - a light source configured to emit a light beam;
   - a frost filter mechanism mechanically coupled to a lens group of the luminaire and configured to move with the lens group along an optical axis of the light beam, wherein the frost filter mechanism comprises:
     - a frost filter configured to be moved from a first position outside of the light beam to a second position in the light beam; and
     - a toggle control coupled to the frost filter and configured to:
       - rotate the frost filter from the first position to the second position when the toggle control is rotated in a first direction; and
       - rotate the frost filter from the second position to the first position when the toggle control is rotated in a second direction;
     - wherein the toggle control is configured to operate as an over-center mechanism configured to:
       - resist rotation of the toggle control in the first direction when the frost filter is in the first position; and
       - resist rotation of the toggle control in the second direction when the frost filter is in the second position; and
     - wherein the toggle control comprises a spring mechanically coupled at a first end to the toggle control and at a second end to a feature mounted in a fixed position relative to an axis of rotation of the toggle control.

9. The luminaire of claim 8, wherein the toggle control is mechanically coupled to the frost filter by a linkage configured to be moved by the toggle control in a first linear direction to rotate the frost filter from the first position to the second position and in a second linear direction to rotate the frost filter from the second position to the first position.

10. The luminaire of claim 8, wherein the lens group is a zoom lens group of a zoom optical system.

11. The luminaire of claim 8, wherein the lens group is a focus lens group of a zoom optical system.

12. The luminaire of claim 8, wherein the toggle control is configured to be manually rotated by an operator of the luminaire.

13. The luminaire of claim 12, wherein the toggle control comprises one or more features configured to facilitate manual rotation of the toggle control.

14. The luminaire of claim 13, wherein the toggle control is configured to protrude through an aperture in a cover of the luminaire.

15. The luminaire of claim 14, wherein the toggle control comprises a feature configured to indicate visually whether the frost filter is in the first position or the second position.

* * * * *